United States Patent
Nepsund

[19]
[11] Patent Number: 6,161,417
[45] Date of Patent: *Dec. 19, 2000

[54] RESTRICTION INDICATOR FOR AIR CLEANERS

[75] Inventor: Larry R. Nepsund, Savage, Minn.

[73] Assignee: Donaldson Company, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/937,916

[22] Filed: Sep. 25, 1997

Related U.S. Application Data

[63] Continuation of application No. 08/511,459, Aug. 4, 1995, abandoned.

[51] Int. Cl.⁷ .................................................. G01L 27/02
[52] U.S. Cl. ......................... 73/1.68; 116/268; 116/270; 340/607; 73/1.57
[58] Field of Search .................................. 73/1.57, 1.62, 73/1.68, 1.59, 118.1; 55/274; 116/268, 270, 272, DIG. 25; 340/607

[56] References Cited

U.S. PATENT DOCUMENTS

| | | |
|---|---|---|
| 3,066,527 | 12/1962 | Stein . |
| 3,068,831 | 12/1962 | Witchell . |
| 3,258,960 | 7/1966 | Baden et al. . |
| 3,335,694 | 8/1967 | Dwyer et al. . |
| 3,443,365 | 5/1969 | Lee et al. . |
| 3,465,707 | 9/1969 | Kashiwaba . |
| 3,939,457 | 2/1976 | Nelson . |
| 3,963,891 | 6/1976 | de Magondeaux ..................... 116/268 |
| 4,020,783 | 5/1977 | Anderson et al. . |
| 4,031,847 | 6/1977 | Sullivan . |
| 4,033,733 | 7/1977 | Nelson . |
| 4,116,156 | 9/1978 | Draxler ................................... 116/268 |
| 4,184,376 | 1/1980 | Thomas et al. . |
| 4,189,707 | 2/1980 | Ermert ................................... 340/607 |
| 4,189,724 | 2/1980 | Onuma et al. . |
| 4,193,292 | 3/1980 | Simonsson ............................. 116/268 |
| 4,369,728 | 1/1983 | Nelson . |
| 4,445,456 | 5/1984 | Nelson . |
| 4,445,457 | 5/1984 | Bargman . |
| 4,651,670 | 3/1987 | Silverwater ............................ 116/268 |
| 4,688,511 | 8/1987 | Gerlach et al. . |
| 5,188,728 | 2/1993 | Traonvoez et al. . |
| 5,351,035 | 9/1994 | Chrisco .......................... 116/DIG. 25 |
| 5,606,311 | 2/1997 | Polidan et al. . |

FOREIGN PATENT DOCUMENTS

| | | |
|---|---|---|
| 25 50 162 A1 | 5/1977 | German Dem. Rep. . |
| 2617972 | 11/1977 | Germany . |

OTHER PUBLICATIONS

Copy of International Search Report mailed Feb. 16, 1999.

Primary Examiner—Hezron Williams
Assistant Examiner—Nashmiya Fayyaz
Attorney, Agent, or Firm—Merchant & Gould P.C.

[57] ABSTRACT

A restriction indicator for an air cleaner of an internal combustion engine. A bellows-type diaphragm is biased toward a retracted position by a first end of a compression spring. A calibration wheel threadingly engaging the housing supports a second end of the compression spring, such that the restriction indicator can be calibrated by rotation of the calibration wheel. An end of the compression spring is seated on a slanted seating surface so that a plunger is pushed off-center to engage a latch and lock the restriction indicator.

14 Claims, 3 Drawing Sheets

RESTRICTION INDICATOR FOR AIR CLEANERS

This is a Continuation of application Ser. No. 08/511,459, filed Aug. 4, 1995 and now abandoned.

FIELD OF THE INVENTION

This invention relates generally to restriction indicators for air cleaner systems, and more particularly to a restriction indicator having a calibration mechanism and a novel spring seating arrangement.

BACKGROUND OF THE INVENTION

Restriction indicators provide a signal indicating when it is necessary to service the air cleaner of an internal combustion engine. They typically are connected to the air outlet of the air cleaner upstream of the intake of the engine. Most mechanical restriction indicators employ a bellows-type diaphragm vented to the atmosphere, which is resisted from expanding by a compression spring. As the air cleaner becomes more contaminated, the differential pressure between the "atmospheric"/high pressure side and the "negative"/low pressure side of the restriction indicator increases, thereby causing the diaphragm to expand. When the differential pressure has reached a certain level, the diaphragm typically becomes locked in an expanded position, and a constant warning signal is provided to the user that the air cleaner should be serviced. An example of such prior art restriction indicators is shown in U.S. Pat. No. 3,443,365.

A significant concern with restriction indicators is the accuracy with which they indicate that a particular differential pressure has been reached. Restriction indicators are designed to provide a warning indication at a specific design pressure differential. It is important that they are accurate because improper indication would result in the air cleaner being serviced earlier or later than intended. It is difficult, however, to consistently manufacture accurate restriction indicators due to the variability of the component parts which make up the assembly. Component parts such as the spring, diaphragm, housing and locking mechanism, even when manufactured to close tolerances, can affect the accuracy of the indicator. Current designs, however, do not provide a mechanism for calibrating and adjusting the restriction indicator to account for these manufacturing variations.

Another problem associated with restriction indicators is providing a locking mechanism which will consistently lock and release after repeated use. In many designs, the locking mechanism includes a resettable plunger which engages a latch to lock the diaphragm in an expanded warning position. An example of this is shown by the '365 patent, in which the plunger is bent to engage the latch off-center.

What has been needed is a restriction indicator for air cleaner systems with a simple mechanism for permitting calibration to adjust for manufacturing inconsistencies. What has also been needed is a simple mechanism for locking a plunger in a restriction indicator.

SUMMARY OF THE INVENTION

According to the present invention, a restriction indicator for an air cleaner system is provided.

In one aspect of the invention, the restriction indicator comprises a housing having high and low pressure chambers. The high pressure chamber is in communication with an inlet and the low pressure chamber is in communication with an outlet of the housing. A bellows-like diaphragm in the housing generally defines the high pressure chamber, and is moveable between expanded and retracted positions. A compression spring in the low pressure chamber has a first end biasing the diaphragm toward the retracted position. A mechanism cooperates with the diaphragm and compression spring to indicate when the diaphragm is in the expanded position. A calibration wheel supports a second end of the compression spring and has a portion which threadingly engages the housing. The threaded portion of the calibration wheel is rotatable so that a biasing force of the spring against the diaphragm can be varied, thereby permitting calibration of the movement of the diaphragm to its expanded position at a predetermined differential between the high and low pressure chambers.

In another aspect of the invention, an adjustable restriction indicator comprises a housing having high and low pressure chambers. The high pressure chamber is in communication with an inlet and the low pressure chamber is in communication with an outlet of the housing. A bellows-like diaphragm in the housing separates the chambers, and is moveable between expanded and retracted positions in response to pressure differences between the chambers. A compression spring in the low pressure chamber has a first end biasing the diaphragm toward the retracted position. A platform supports a second end of the compression spring and has a portion which threadingly engages the housing. The threaded portion of the platform is rotatable so that a biasing force of the spring against the diaphragm can be varied.

In yet another aspect of the invention, the invention comprises an improvement in restriction indicators of the type where an expandable bellows-like diaphragm is biased by a compression spring toward a retracted position, and a resettable plunger engages a latch to lock the diaphragm in an expanded warning position. A member of the restriction indicator includes a slanted seating surface on which an end of the compression spring is seated. When the diaphragm expands to the expanded warning position, the spring pushes the plunger off-center to engage the latch.

These and other advantages and features of novelty that characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

DETAILED DESCRIPTION OF THE PREFERRED EMBODIMENT

Figure 1:
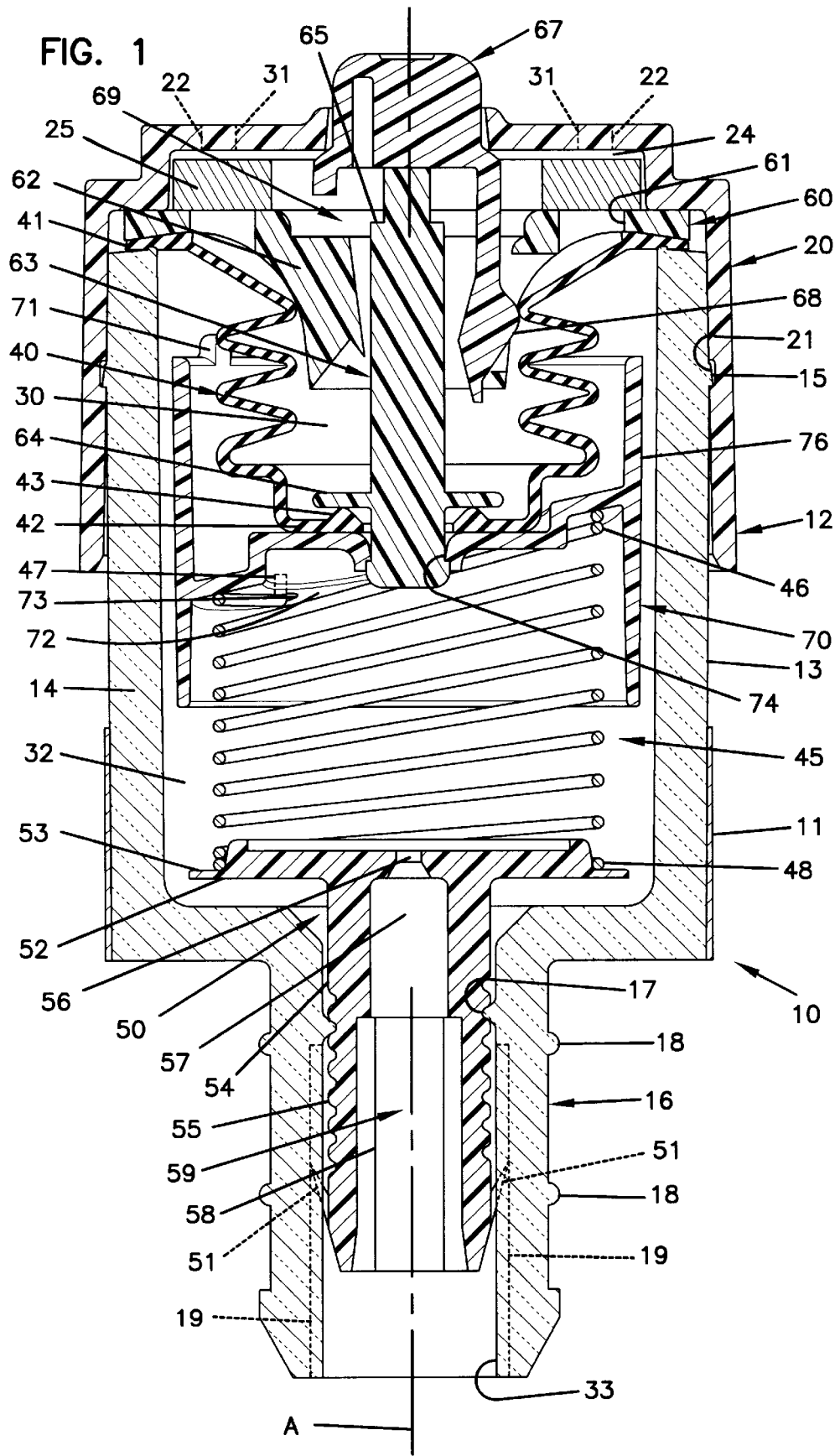
FIG. 1 is a cross-sectional view of a restriction indicator according to the present invention, with the indicator in a non-warning position.
Figure 2:
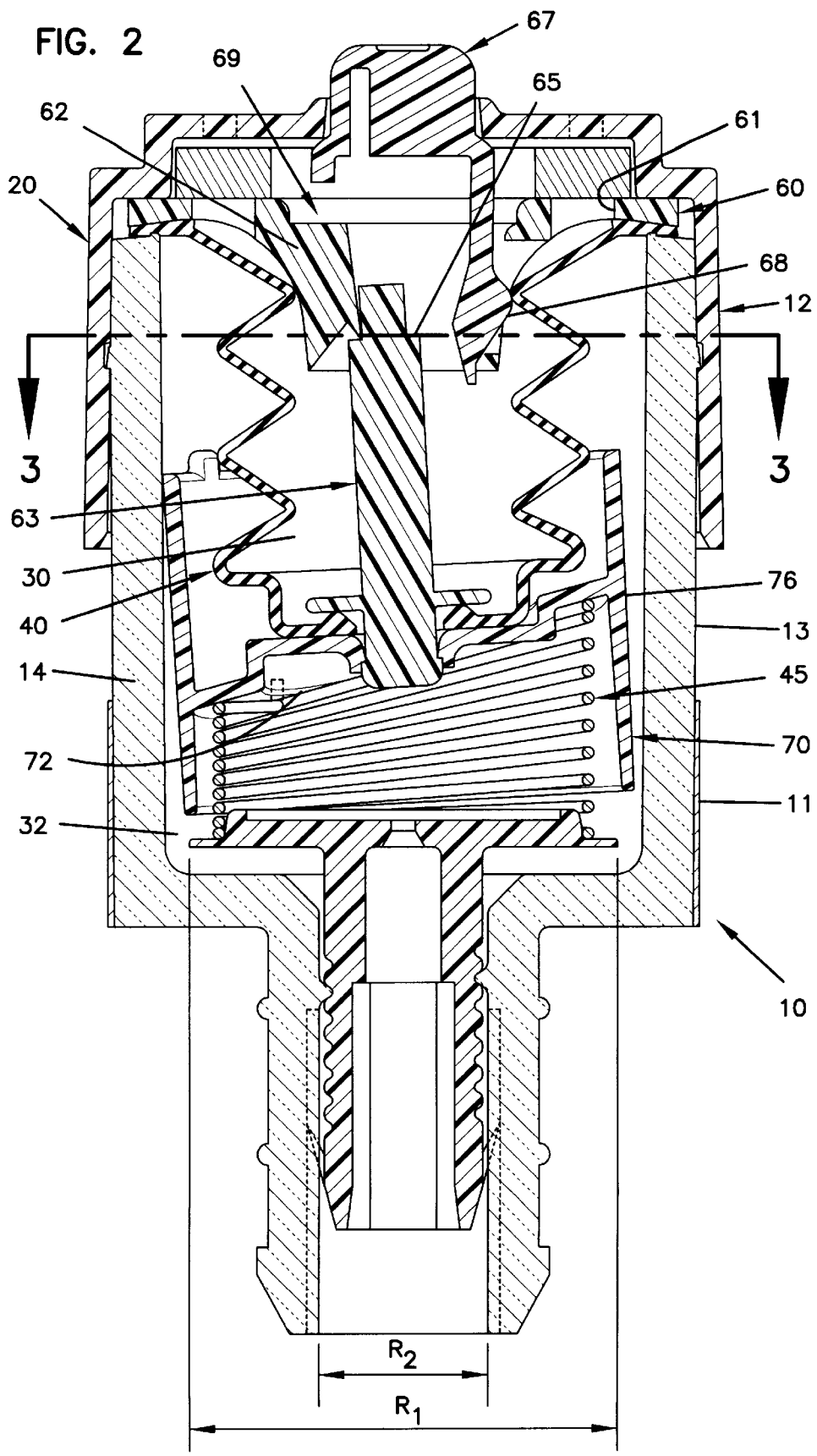
FIG. 2 is a cross-sectional view of the restriction indicator shown in FIG. 1, with the indicator in a warning position.
Figure 3:
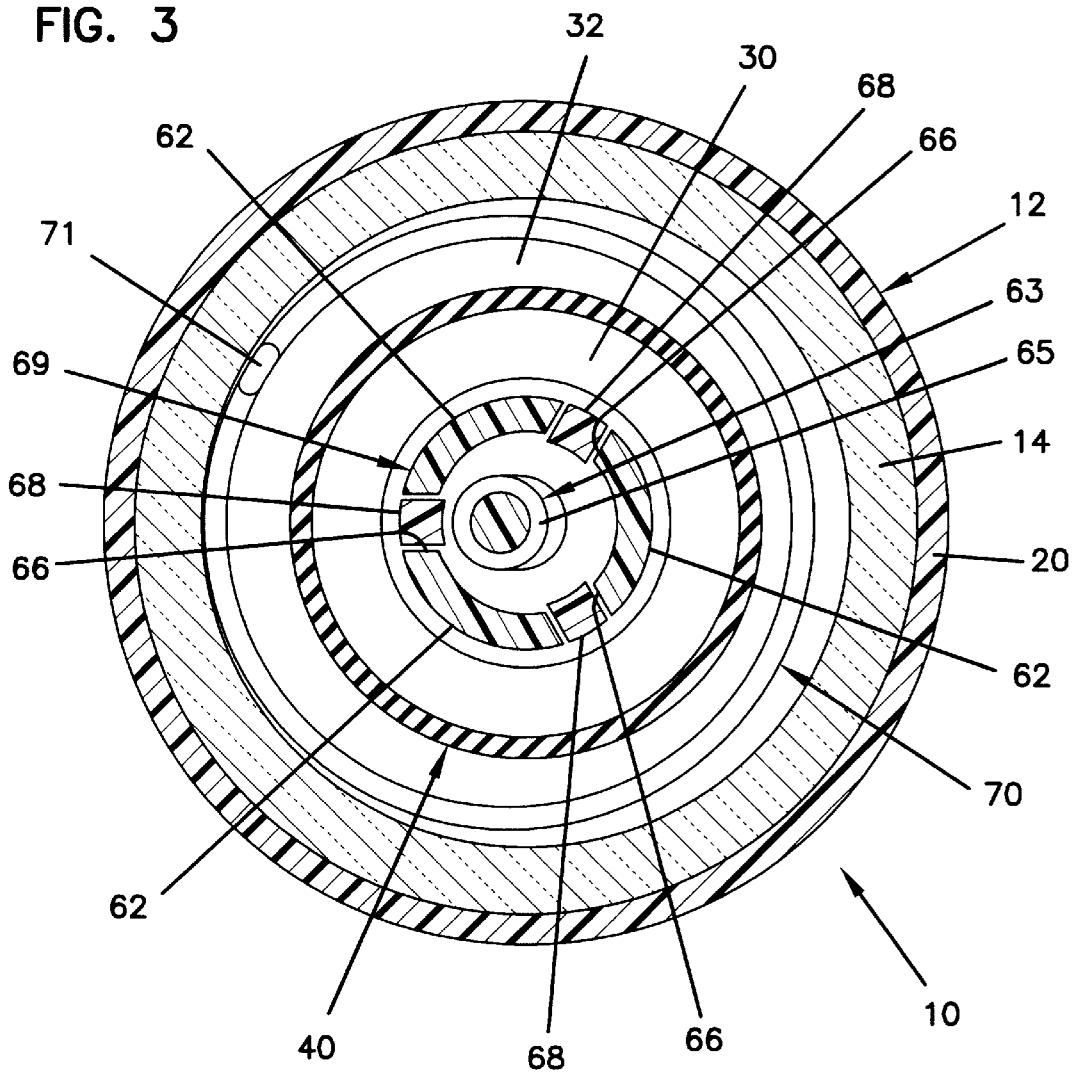
FIG. 3 is a cross-sectional view of the restriction indicator shown in FIG. 2, as viewed generally from section 3—3.

Referring now to the drawings wherein like numerals designate like parts, a restriction indicator according to the present invention is shown in FIGS. 1–3. The restriction indicator of the present invention can be used in conjunction with a variety of air cleaner systems for internal combustion engines. In the preferred arrangement, restriction indicator 10 is connected to a tubular member at the outlet of the air cleaner upstream of the intake of the engine, not shown. Restriction indicator 10 is inserted into an aperture of the tubular member, with a rubber grommet (not shown) positioned around barb 16 to provide a press fit seal in the area between annular rings 18.

Referring to FIG. 1, restriction indicator 10 comprises housing 12 including casing 14 and cap 20 enclosing the open end of casing 14. The housing 12 is aligned along a longitudinal reference axis A—A. Cap 20 is releasably connected to casing 14 by means of ramped ridge 15 which is snap fit into channel 21 of cap 20. Defined within housing 12 are high 30 and low 32 pressure chambers. High pressure chamber 30 is in communication with the atmosphere via an inlet 31 defined by three apertures 22 in cap 20 spaced at 120° intervals. Low pressure chamber 32 is in communication with an outlet 33 formed in barb 16 which in turn is in communication with the negative pressure side of the air cleaner, not shown.

Expandable diaphragm 40 generally defines high pressure chamber 30, which enlarges as diaphragm 40 expands. It is said herein that diaphragm 40 "generally" defines high pressure chamber 30 because chamber 30 also includes portions of the housing between the open end of diaphragm 40 and inlet 31. It will be understood that this area could be larger or smaller depending on the design. Diaphragm 40 is a flexible, expandable bellows-type diaphragm. It will be understood that a variety of diaphragms with similar characteristics could be employed within the principles of the invention. Diaphragm 40 includes lip 41 which is compressed between retainer 60 and a shoulder of casing 14, with cap 20 pushing downwardly on retainer 60. Interposed between cap 20 and retainer 60 is an annular filter 25 in recess 24 of cap 20. Filter 25 is made of DACRON polyester fiber or the like and prevents contaminants from entering high pressure chamber 30.

Compression spring 45 biases diaphragm 40 toward a retracted position, as for example the position shown in FIG. 1. FIG. 2 shows diaphragm 40 in an expanded and locked position, with spring 45 being compressed by diaphragm 40. Spring 45 is seated as its upper end 46 with seating surface 72 of signal and at its lower end 48 with seating surface 53 of calibration wheel 50.

Diaphragm 40 is connected to signal 70 by means of plunger 63 which is snap fit into a corresponding opening 74 in signal 70. Base 42 of diaphragm 40 is held and sealed between plate 64 of plunger 63 and signal 70. A raised portion 43 of base 42 assures proper sealing.

Signal 70 moves downwardly and upwardly with the expansion and retraction of diaphragm 40. Outer screen 76 of signal 70 is visible through casing 14, which is transparent, in the portion forming a window 13 between the lower end of cap 20 and opaque covering 11 on casing 14.

Alternatively, opaque covering 11 could be removed. Screen 76 is color coded and includes the words "CHANGE AIR FILTER," becoming visible through window 13 when diaphragm 40 is in its expanded position, as shown in FIG. 2. Signal 70 also includes tab 71 used to align with apertures 61 in retainer 60 for consistent assembly.

Restriction indicator 10 includes a locking assembly 69 which is largely known in prior designs. Although a locking mechanism is not absolutely necessary, it is preferable to provide a constant indication that the design pressure differential has been reached, so that a warning is provided when the engine is not operating. Locking mechanism 69 includes plunger 63 connected to move with signal 70 and with base 42 of diaphragm 40, and three circumferentially spaced latches 62 extending downwardly from retainer 60, best shown in FIG. 3. Referring to FIG. 2, when diaphragm 40 has expanded to its expanded position, plunger 63 is pushed off-center so that flange 65 of plunger 63 engages with latch 62, thereby locking diaphragm 40 and signal 70 in a warning position. Resetting the restriction indicator 10 is accomplished by manually depressing release button 67. Release button 67 has three fingers 68 which extend downwardly into three corresponding slots 66 between flanges 65, as shown in FIG. 3. Fingers 68 and slots 66 are constructed to guide fingers 68 inwardly to recenter plunger 63 as release button 67 is depressed, thereby releasing plunger 63 from latch 62 and returning diaphragm 40 to its retracted position under the force of spring 45. It will be appreciated that the locking and resetting mechanisms could be constructed in a number of other ways.

A novel aspect of locking mechanism 69 is the slanted spring seating surface 72 on signal 70. Slanted seating surface 72 causes plunger 63 to be pushed off-center to securely engage latch 62. While slanted seating surface 72 is on signal 70 at upper end 46 of spring 45, it will be understood that the slanted surface could be on some other member of the device, and lower end 48 of spring 45 or both ends 46, 48 could be seated on a slanted surface. In the preferred arrangement, a single slanted seating surface 72 having an angle of approximately 15 degrees is employed. Slant angles of between 50° and 20° could also be beneficially employed. Spring 45 is of an approriate strength and, when not deformed by slanted seating surface 72, is flat (not slanted) at both ends 46, 48. To ensure proper and consistent seating of spring 45 at upper end 46, a bent axial projection 47 of spring 45 is inserted into aperture 73 of seating surface 72.

Calibration wheel 50 is provided to permit calibration of restriction indicator 10 by adjusting the biasing force of spring 45 against diaphragm 40. Calibration wheel 50, which defines a platform, includes plate 52 supporting spring 45, and shaft 54 extending downwardly into barb 16 of housing 12. The plate 52 has a radial dimension $R_1$ that is larger than a corresponding radial dimension $R_2$ of the outlet 33 defined through the barb 16. Shaft 54 has external threads 55 which engage a corresponding internal thread 17 of barb 16. It will be appreciated that calibration wheel could be configured in a number of other ways within the principles of the invention, as for example with a plate having external threads engaging an inner wall of the housing. Also, while the preferred calibration wheel 50 is molded as a single part, it could comprise two or more parts, as for example a stationery plate rotatably connected to a threaded shaft.

Communication between low pressure chamber 32 and outlet 33 is provided by central passage 59 of calibration wheel 50, which includes orifice 56 and first 57 and second 58 portions. Orifice 56 is sized and configured to reduce the transmission of pressure pulses from the engine intake to low pressure chamber 32, which can cause premature restriction indication. Second portion 58 of passage 59 is shaped hexagonally in cross section to receive an allen wrench (not shown) for threadingly rotating calibration wheel 50. Shaft 54 of calibration wheel 50 is provided with two flexible ears extending radially outwardly. When calibration wheel 50 is rotated, ears 51 "ratchet" against the inner wall of barb 16, also hexagonally shaped, and lock into position in two of six spaced slots 66 in barb 16. This prevents unintended rotation of calibration wheel 50, which could affect the calibration.

Individual restriction indicators are calibrated as follows. A weight corresponding to the design pressure differential (in this case approximately 20 inches of water) is placed on the top of plunger 63. The calibration wheel 50 is then rotated counterclockwise with an allen wrench until the plunger is lowered to a set point. The restriction indicator, now calibrated for improved accuracy, is ready to go into service.

It should be understood that the present invention is not limited to the preferred embodiment discussed above, which is illustrative only. Changes may be made in detail, especially in matters of shape, size, arrangement of parts, or material of components within the principles of the invention, to the full extent indicated by the broad general meanings of the terms in which the appended claims are expressed.

What is claimed is:

1. A restriction indicator for an air cleaner system of an internal combustion engine, the indicator comprising:

(a) a housing aligned along a housing axis, the housing including a main portion having high and low pressure chambers, the high pressure chamber being in communication with atmosphere through an inlet and the low pressure chamber being in communication with an outlet passage, the outlet passage being formed through a housing extension that projects outward from the main portion of the housing along the housing axis;

(b) a diaphragm that divides the housing into the high and low pressure chambers, the diaphragm being moveable relative to the housing along the housing between expanded and retracted positions, the diaphragm moving between the expanded and retracted positions in response to pressure differences between the chambers;

(c) a signal member for visually indicating when the diaphragm is in the expanded and retracted positions, the signal member being positioned within the main portion of the housing and being at least partially visible through the housing, the signal member being moveable along the housing axis in concert with the diaphragm;

(d) a spring positioned in the low pressure chamber, the spring having a first end that engages the signal member thereby causing the diaphragm to be biased toward the retracted position;

(e) a calibration member including an elongated shaft and a spring support that projects transversely outward from the shaft, the spring support being configured to support a second end of the spring, the shaft being positioned within the outlet passage of the housing extension and the spring support being located within the low pressure chamber, the spring support having a radial dimension that is larger than a corresponding radial dimension of the outlet passage such that the spring support can not pass through the housing extension, and the calibration member being constructed and arranged to permit calibration of the restriction indicator by moving the calibration member along the housing axis to vary a biasing force of the spring against the signal member; and (f) the housing extension forming a connector for connecting the restriction indicator to the air cleaner system of the internal combustion engine.

2. A restriction indicator according to claim 1, wherein the shaft of the calibration member has external threads engaging at least one corresponding internal thread within the outlet passage.

3. A restriction indicator according to claim 1, wherein a portion of the shaft of the calibration member is shaped to receive a tool for rotating the calibration member to thread the calibration member within the outlet passage.

4. A restriction indicator according to claim 1, wherein the shaft of the calibration member includes a plurality of flexible ears extending radially outwardly from the shaft, and the housing includes a plurality of corresponding slots in an inner side of the outlet passage, such that the ears can be ratcheted relative to the outlet passage and locked into position in the slots to prevent unintended rotation of the calibration member.

5. A restriction indicator according to claim 1, further including means for automatically locking the diaphragm in the expanded position so as to provide a constant indication that a predetermined pressure differential has been reached, and means for manually resetting the locking means.

6. A restriction indicator according to claim 1, wherein the calibration member defines an axial passage, and at least a portion of the axial passage is configured to receive a tool for rotating the calibration member.

7. A restriction indicator according to claim 1, wherein the calibration member defines an axial passage, and at least a portion of the axial passage comprises an orifice sized and configured to reduce transmission of pressure pulses from the outlet passage to the low pressure chamber.

8. A restriction indicator according to claim 1, wherein the connector comprises a barb.

9. A restriction indicator according to claim 1, wherein the spring support and the shaft of the calibration member are formed as a single unitary piece.

10. A restriction indicator according to claim 1, wherein the shaft of the calibration member is threaded within the outlet passage.

11. A restriction indicator according to claim 1, wherein the shaft of the calibration member engages corresponding structure in the outlet passage of the housing extension in a manner that permits the calibration member to be moved relative to the housing and along the housing axis, and in a manner that thereafter holds the calibration member in place relative to the housing.

12. A restriction indicator according to claim 11, wherein the calibration member is moved by a removable tool.

13. A restriction indicator according to claim 1, wherein the diaphragm comprises a bellows.

14. A restriction indicator according to claim 1, wherein the spring comprises a coil spring.

\* \* \* \* \*

UNITED STATES PATENT AND TRADEMARK OFFICE
CERTIFICATE OF CORRECTION

PATENT NO. : 6,161,417
DATED : December 19, 2000
INVENTOR(S) : Nepsund

It is certified that error appears in the above-identified patent and that said Letters Patent is hereby corrected as shown below:

<u>Column 4,</u>
Line 31, "50º" should read -- 5º --

<u>Column 5,</u>
Line 34, insert -- axis -- before the word "between"

Signed and Sealed this

Ninth Day of September, 2003

JAMES E. ROGAN
*Director of the United States Patent and Trademark Office*